(No Model.)

W. D. McCOY.
BICYCLE SADDLE.

No. 314,701. Patented Mar. 31, 1885.

Witnesses
Harold Serrell
Chas. H. Smith

Inventor
per William D. McCoy
Lemuel W. Serrell
atty

N. PETERS. Photo-Lithographer, Washington, D. C.

UNITED STATES PATENT OFFICE.

WILLIAM D. McCOY, OF ORANGE, NEW JERSEY.

BICYCLE-SADDLE.

SPECIFICATION forming part of Letters Patent No. 314,701, dated March 31, 1885.

Application filed February 3, 1885. (No model.)

*To all whom it may concern:*

Be it known that I, WILLIAM D. McCOY, of Orange, in the county of Essex and State of New Jersey, have invented a certain new and useful Improvement in Bicycle-Saddles; and the following is declared to be a description of the same.

Bicycle-saddles have heretofore been made in a great variety of forms; but those belonging especially to the same class as my invention are constructed with a flexible or pliant seat supported by a frame connected to the backbone of the bicycle, which frame consists of parallel arms or bars, the ends of which are coiled or simply bent and extended upward for connection to the forward and back ends of the seat proper, and these arms or bars are made in one or two continuous pieces extending from front to back of the saddle.

My invention consists of a saddle in which there is combined with a flexible or pliant seat a clip for connecting the front of the saddle to the neck of the backbone, and a rubber buffer in this clip and resting upon the backbone to relieve jar, and also a coiled spring connecting the back of the saddle to the backbone of the bicycle, which spring is capable of both a downward and forward movement, yielding in these directions to impart elasticity to the saddle while the bicycle is being ridden.

Figure 1:
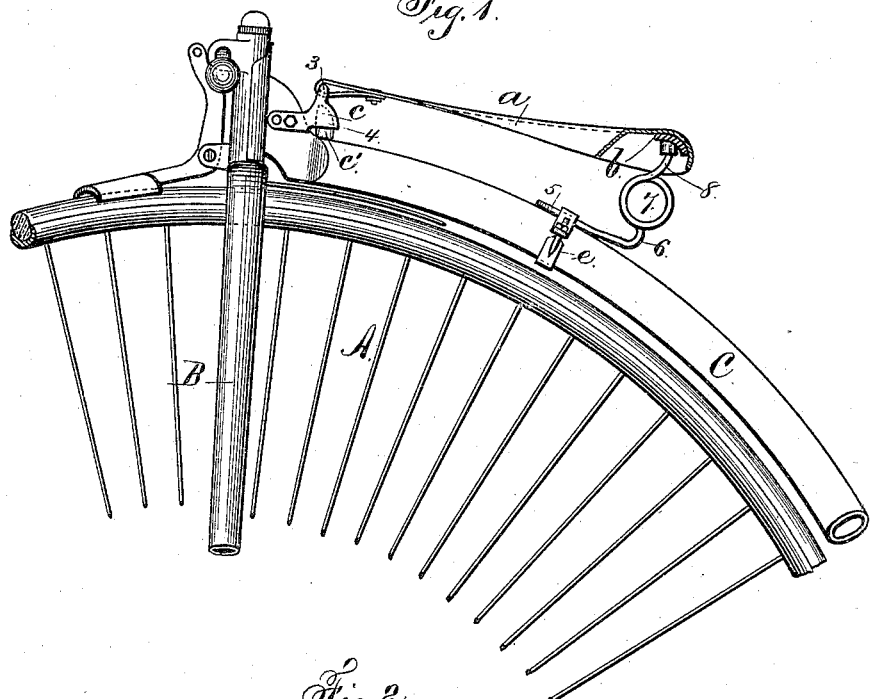
Figure 2:
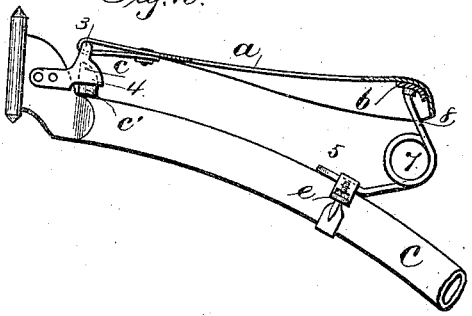
Figure 3:
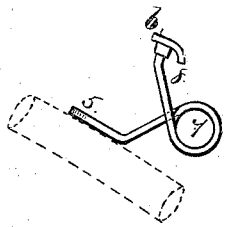
Figure 4:
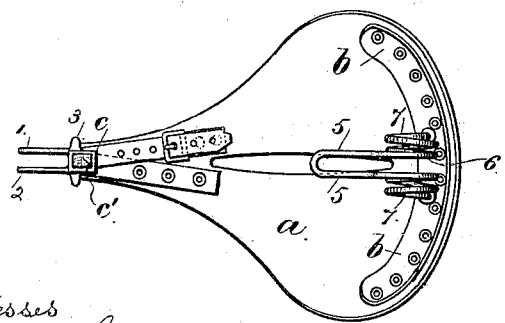
Figure 5:
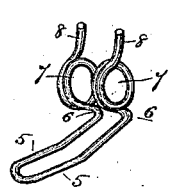

In the drawings, Figure 1 is an elevation of my improved saddle and part of a bicycle to which it is attached. Figs. 2 and 3 are elevations of modified forms of the back spring. Fig. 4 is an inverted plan of the saddle, and Fig. 5 is a perspective view of the back spring.

The bicycle may be of any desired form, as my saddle is adapted to fit any crank machine.

A represents the wheel, B the forks, and C the backbone. $a$ is the flexible or pliant seat, to the back of which the usual metal frame, $b$, is riveted. The front of the saddle is connected to the clip-block $c$ by its front portion being turned downward and through an eye upon the top of the clip and back under the seat portion, where the parts are riveted together. I however prefer to use the strap shown in Fig. 4 to connect the saddle to the clip $c$, and in this case the slack incident to wear can be taken up, as one end of the strap is riveted fast to the under side of the saddle, and there is a bucket into which the other end of the strap is passed. The clip-block $c$ is made of the shape shown, having perforated arms or straps 1 2 extending out at the sides of the neck of the backbone. A bolt passes through the strap and neck. There is an eye, 3, for the connection to the saddle, and a hollow shell portion, 4, in which is fitted a rubber block, $c'$, to rest upon the backbone and relieve the front of the saddle from jar.

The back spring is composed of a single piece of steel wire bent to form as shown, and having arm portions 5 parallel to each other, but bent up at about an angle of ten or fifteen degrees, extending as return-bends 6 and coils 7. These coils 7 are upon the outer sides of the arms 5, and the ends of the wire above the coils are bent upward at 8 and secured to the frame $b$. The action of this back spring when the rider's weight is upon the seat is twofold—viz., to pull the portions 8 forward and distend the coils 7, and to bend down the back portion of the arms 5, thus affording elasticity in a twofold sense in the required direction and making the saddle easy and comfortable. The height of the saddle is adjusted by the position of the back spring upon the backbone, and any slack in the saddle incident to this adjustment can be taken up by the strap shown in Fig. 4. The arms 5 are connected to the backbone of the bicycle by the clamp or clip $e$.

The spring shown in Figs. 2 and 3 is slightly different and of modified form from the spring shown in Figs. 1, 4, and 5, in that the return-bend 6 is dispensed with; but the same general features are preserved, the spring being formed from one piece coiled and bent double.

I claim as my invention—

1. In a bicycle-saddle, the combination, with the flexible seat or saddle, of a clip, $c$, for connecting the front of the saddle to the neck of the bicycle-backbone, a rubber buffer, $c'$, in said clip, and a spring formed of a single wire or rod coiled and connecting the frame of the saddle to the bicycle-backbone, respectively, substantially as and for the purposes set forth.

2. In a bicycle-saddle, the combination, with the flexible seat and a spring for connecting the back frame of the saddle to the bicycle-backbone, of a clip, c, having perforated arms 1 2, bolted to the neck, an eye, 3, for the saddle, a shell portion, 4, and a rubber block or buffer, c', substantially as set forth.

3. In a bicycle-saddle, the combination, with the flexible seat and an independent clip connecting the front of the saddle to the neck of the bicycle-backbone, of a double coiled spring formed of a single piece of wire having the parallel and inclined portions 5, the return-bends 6, the coils 7, and the upper portions, 8, to connect the spring to the saddle, and a clip for connecting said spring upon the backbone, the parts being constructed and operating substantially in the manner and for the purposes set forth.

Signed by me this 31st day of January, A. D. 1885.

WILLIAM D. McCOY.

Witnesses:
  HAROLD SERRELL,
  WALLACE L. SERRELL.